Figure 1:
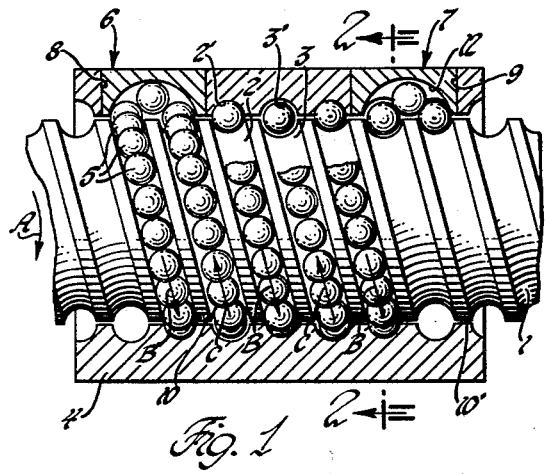

April 6, 1965   D. R. ROWLAND   3,176,535
BALL BEARING NUT AND SCREW ASSEMBLY
Filed Nov. 8, 1962

INVENTOR.
Dan R. Rowland
BY
A. M. Heiter
ATTORNEY

United States Patent Office 3,176,535
Patented Apr. 6, 1965

3,176,535
BALL BEARING NUT AND SCREW ASSEMBLY
Dan R. Rowland, Saginaw, Mich., assignor to General Motors Corporation, Detroit, Mich., a corporation of Delaware
Filed Nov. 8, 1962, Ser. No. 236,344
16 Claims. (Cl. 74—459)

The present invention relates to a ball bearing nut and screw assembly and more particularly it pertains to a ball bearing nut and screw assembly having novel ball recirculating means.

In ball bearing nut and screw assemblies there has always been the attendant problem of providing simple and efficient means for returning the balls from one end of the loaded ball race back to the other end of the loaded ball race. Conventionally, in such assemblies, the solution has been to provide a long return tube either external or internal of the nut for returning the balls to and from the loaded ball race and this has frequently been found to be undesirable in certain applications because of the additional radial space required by the return tube. In addition, it has been the experience of those using a ball bearing nut and screw assembly having return tube means to find that the return tube means can adversely effect the operation of the ball bearing nut and screw assembly under certain circumstances by hindering movement of the balls, the latter occurring, for instance, should a break or bend occur in the return tube.

The present invention comprises a ball bearing nut and screw assembly having means including ball deflector means receiving the balls from one end of the loaded ball race and returning them along a helical return path to the other end of the loaded ball race, the helical return path being characterized in that it is formed by passageway means on the nut and screw which cooperate with each other to provide a helical return passageway sufficiently large to freely accommodate a ball. The helical return passageway can be formed in various ways such as can be observed in the drawing and the detailed description to follow.

An object of the present invention is to provide in a ball bearing nut and screw assembly, a nut having an internal helical groove, a screw having a corresponding external helical groove, said grooves cooperating with each other to form a race and a train of balls loaded in the race to provide a connection between the nut and screw, and passageway means on said nut and screw cooperating with each other to form a ball return passageway for returning the balls from one end of said loaded race to the other end of said loaded race.

Another object of the present invention is to provide in a ball bearing nut and screw assembly, a nut having an internal helical groove, a screw having a corresponding external helical groove, said grooves cooperating with each other to form a race and a train of balls loaded in the race to provide a connection between the nut and screw, and wall portions on said nut and screw acting in cooperation with each other to form a helical passageway for returning the balls to either end of said loaded ball race.

Another object of the present invention is to provide in a ball bearing nut and screw assembly, a nut having an internal helical groove, a screw having a corresponding external helical groove, said grooves cooperating with each other to form a race and a train of balls loaded in the race to provide a connection between the nut and screw, and oppositely disposed helical grooves in said nut and screw forming a passageway for returning the balls to either end of said loaded ball race.

An additional object of the present invention is to provide in a ball bearing nut and screw assembly, a nut having an internal helical groove, a screw having a corresponding external helical groove, said grooves cooperating with each other to form a race and a train of balls loaded in the race to provide a connection between the nut and screw, and ball return passageway means including an internal helical return groove in the nut for returning the balls to either end of said loaded ball race.

An additional object of the present invention is to provide in a ball bearing nut and screw assembly, a nut having an internal helical groove, a screw having a corresponding external helical groove, said grooves cooperating with each other to form a race and a train of balls loaded in the race to provide a connection between the nut and screw, and ball return passageway means including an external helical return groove on the screw for returning the balls to either end of said loaded ball race.

These and other objects of the invention will be more apparent from the following description of the preferred embodiments of the invention described in the following specification and shown in the drawing.

Figure 2:
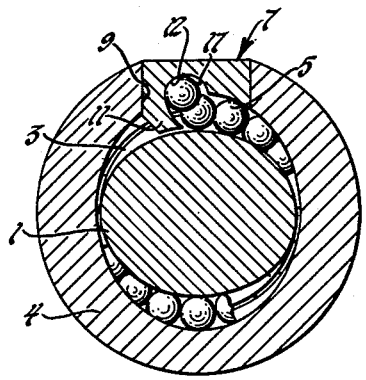
Figure 3:
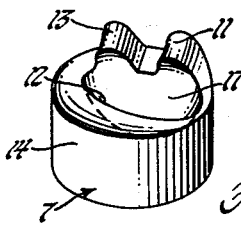
Figure 4:
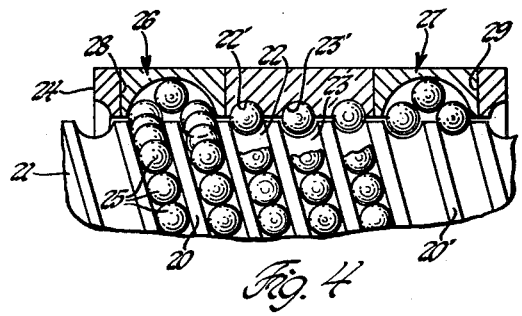
Figure 5:
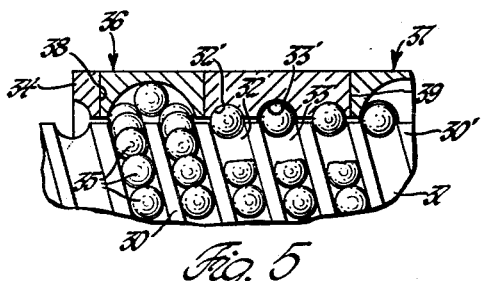
Figure 6:
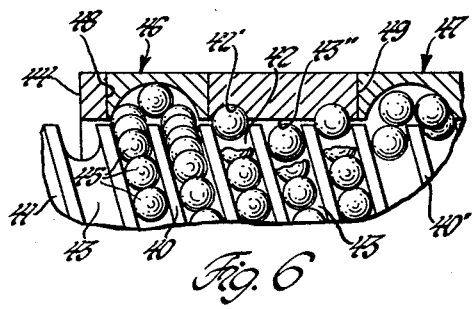
Figure 7:
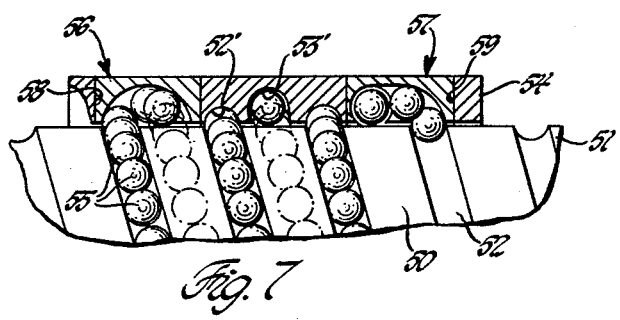

In the drawing:
FIGURE 1 is a sectional view of one embodiment of the invention.
FIGURE 2 is a sectional view on the line 2—2 in FIGURE 1.
FIGURE 3 is a perspective view of the deflector member utilized to deflect the balls from the race to the return passageway and also from the return passageway to the race.
FIGURE 4 is a fragmentary sectional side view of another embodiment of the invention.
FIGURE 5 is a fragmentary sectional side view of another embodiment of the invention.
FIGURE 6 is a fragmentary sectional side view of another embodiment of the invention.
FIGURE 7 is a fragmentary sectional side view of another embodiment of the invention.

In FIGURE 1 there is shown one embodiment of the invention comprising a screw 1 having a pair of external axially spaced helical grooves 2, 3 wherein groove 3 preferably has the same lead as that of groove 2 and is larger or wider and deeper than groove 2. A nut 4 having a pair of axially spaced internal helical grooves 2', 3' corresponding to the external helical grooves 2, 3 respectively is carried on the screw 1. The corresponding grooves 2, 2' form a race and a train of balls 5 is loaded in the race to provide a connection between the screw 1 and nut 4. The balls 5 transmit thrust and move along the race defined by grooves 2, 2' in a normal manner upon relative movement between screw 1 and nut 4. The corresponding grooves 3, 3' form a helical ball return passageway between the ends of the loaded ball race which is sufficiently large to freely accommodate a ball so that the balls 5 traveling therethrough cannot be loaded. Ball deflector members 6, 7 provided deflector means or crossover means for deflecting the balls 5 over the external lands or crests 10, 10' on screw 1 respectively to transfer the balls 5 from the loaded race to the return passageway and from the return passageway to the loaded race and are mounted and suitably secured in axially spaced apertures 8, 9 respectively in nut 4.

Referring to FIGURE 1, if nut 4 is held stationary and screw 1 is rotating in the direction of arrow A, the balls 5 in the loaded race defined by grooves 2, 2' are caused to be rolled therealong in the direction of arrows B. When the balls 5 reach the end of the loaded race, they contact with the deflector member 7 and are caused to be moved thereby radially out of the loaded race, up and over land 10' and into the return passageway formed by the grooves 3, 3'. As best shown in FIGURE 2, the balls 5 initially contact a deflector finger or contoured portion 11 depending from deflector member 7. The balls 5 on contacting the deflector finger 11 are forced to move up along one side of the deflector finger and out of the loaded race. The forced movement of the balls 5 which occurs after they have left the loaded race results from the fact that the balls 5 after leaving the loaded race are still a part of a continuous train of balls which has a portion thereof being acted upon by the walls of grooves 2, 2'; that is, the balls 5 in the loaded race are being acted upon by the walls forming the race. The balls 5 after having been moved out of the loaded race by the deflector finger 11 follow a wall 12 formed on deflector member 7 thereby passing over land 10', and are routed into the return passageway defined by the grooves 3, 3' by another deflector finger 13 shown in FIGURE 3 which extends into the return passageway and is similar to deflector finger 11. The balls 5 in the return passageway are moved or skidded therealong in a direction indicated by arrows C which is opposite the direction of rotation of screw 1 by forces transmitted to them through the train of balls 5, those forces being transmitted resulting from the rolling forces imparted to the balls 5 in the loaded race by the walls of grooves 2, 2'. The balls 5 move or skid along the return passageway until they reach the deflector member 6. Deflector member 6 has a pair of deflector fingers the same as those of deflector member 7 and is positioned in aperture 8 so that its deflector fingers point in a direction opposite to the direction of the deflector fingers of deflector member 7. Deflector member 6 has one of its deflector fingers extending into the return passageway or unloaded race and its other deflector finger extending into the loaded race. Deflector member 6 by means of its deflector fingers deflects the balls 5 from the return passageway, passes the balls 5 over the land 10 and into the loaded race in the same manner as deflector member 7 deflected the balls 5 from the loaded race to the return passageway. If the rotation of screw 1 is reversed, the balls 5 will be caused to travel in a direction opposite that of the direction of the arrows shown and because each of the deflector members 6, 7 has similar deflector fingers extending into both the loaded race and return passageway, the balls 5 will be caused to be deflected over the lands and to and from the loaded race and return passageway in the same manner but in a direction reversed to that previously described.

FIGURE 3 illustrates the deflector member 7 utilized in the embodiment of invention shown in FIGURES 1 and 2. The deflector member 7 has a main body portion 14 and a pair of similar deflector fingers 11, 13 depending therefrom. A recess 17 is formed in the main body portion 14 and provides an arcuate or curved ball portion 12 for reversing the direction of ball travel and in conjunction with the deflector fingers describes a substantially U-shaped path for ball travel. Each of the deflector fingers 11, 13 is adapted to extend into a race or a return passageway of the type described and provides means for deflecting balls out of a loaded race or return passage and routing them along an arcuate path, thereby passing them over a land portion or crest on a screw, and into a corresponding return passageway or loaded race respectively. The deflector member 6 shown in FIGURE 1 and also the deflector members 26, 27 shown in FIGURE 4 and the deflector members 36, 37 shown in FIGURE 5 are the same as deflector member 7.

FIGURE 4 shows another embodiment of the invention comprising a screw 21 having a pair of axially spaced external helical grooves 22, 23 wherein groove 23 preferably has the same lead as groove 22. A nut 24 having a pair of axially spaced internal helical grooves 22', 23' is carried on the screw 21. Each of the grooves 22', 23' has the same lead as that of grooves 22, 23 and a width and depth corresponding to that of groove 22. A train of balls 25 is loaded in a race defined by grooves 22, 22' and provides a connection between nut 24 and screw 21. In this instance, the groove 23 is made sufficiently larger than groove 23' so that it in conjunction with groove 23' forms a helical return passageway sufficiently large to freely accommodate a ball. Deflector members 26 and 27 are mounted and suitably secured in apertures 28 and 29 respectively and deflect the balls 25 over lands 20 and 20' on screw 21 so that the balls 25 are transferred to and from the loaded race and return passageway in the same manner as the deflector members 6, 7 described in FIGURE 1.

FIGURE 5 shows another embodiment of the invention comprising a screw 31 having a pair of axially spaced external helical grooves 32, 33 wherein groove 33 preferably has the same lead, width and depth as that of groove 32. A nut 34 having a pair of axially spaced internal helical grooves 32', 33' is carried on the screw 31. Each of the grooves 32', 33' has the same lead as that of grooves 32, 33 and groove 32' has the same width and depth as that of groove 32. The internal helical groove 33' is made larger than groove 33. A train of balls 35 is loaded in a race defined by the grooves 32, 32' to provide a connection between nut 34 and screw 31. In this instance, the groove 33' is made sufficiently wide and deep so that it in conjunction with groove 33 forms a return passageway sufficiently large to freely accommodate a ball. Deflector members 36, 37 are mounted and suitably secured in apertures 38, 39 respectively in nut 34 and deflect the balls 35 over lands 30 and 30' on screw 31 so that the balls 35 are transferred to and from the loaded race and return passageway in the same manner as the deflector members 6, 7 described in FIGURE 1.

FIGURE 6 shows another embodiment of the invention comprising a screw 41 having a pair of axially spaced external helical grooves 42, 43 wherein the groove 43 preferably has the same lead as that of groove 42 and is wider and deeper than groove 42. A nut 44 having an internal helical groove 42' corresponding to the external helical groove 42 is carried on the screw 41. A train of balls 45 is loaded in the race defined by the grooves 42, 42' and provides a connection between nut 44 and screw 41. The groove 43 is made sufficiently wide and deep so that it in conjunction with an internal land 43" in nut 44 formed by the internal helical groove 42' forms a return passageway sufficiently large to freely accommodate a ball. Suitable deflector members 46 and 47 are mounted and secured in apertures 48, 49 respectively in nut 44 and provide adequate means for deflecting the balls 45 over lands 40, 40' to transfer the balls 45 to and from the loaded race and return passageway. In this instance, the respective deflector fingers of deflector members 46, 47 which extend into the return passageway are extended in length to accommodate for the depth of the external helical groove 43.

FIGURE 7 shows another embodiment of the invention comprising a screw 51 having an external helical groove 52 and an external land 50. A nut 54 having a pair of axially spaced internal helical grooves 52', 53' is carried on the screw 51. Groove 52' has a lead, width and depth corresponding to that of external helical groove 52 and groove 53' preferably has the same lead as groove 52. A train of balls 55 is loaded in a race defined by grooves 52, 52' and provides a connection between nut 54 and screw 51. The internal helical groove 53' is made sufficiently wide and deep so that it in conjunction with the external land 50 on screw 51 forms a return passageway sufficiently large to freely accommodate a ball. Deflector members 56, 57 are mounted and secured in apertures 58, 59 in nut 54 and deflect balls 55 over land 50 to transfer the balls 55 to and from the loaded race and return passageway. In this instance, the respective deflector fingers of deflector members 56, 57 which extend into the return passageway are shortened in length to accommodate for the fact that the return passageway lies outside the diameter of screw 51.

Each of the above-described modifications of the invention employs two cooperating pairs of groove means on the nut and/or the screw cooperating to provide first a loaded race wherein the balls are in simultaneous loaded contact and a return passageway or race wherein the balls are not in loaded contact. While it is preferred that the loaded race and return passageway have the same pitch, variations within the structural limits of the device may be made. In these embodiments one or both of the grooves in the screw and nut forming the return passageway are enlarged so that the balls move freely or are unloaded in this passageway. If the size of one groove for the return passageway is the same as or smaller than the loaded race groove, the other groove must be correspondingly enlarged so the balls are unloaded in the return passageway. In each of these embodiments the configuration of the grooves provides two interwound helical passageways, one having a configuration to load the balls and the other to unload the balls.

The above-described preferred embodiments are illustrative of the invention which, as will be appreciated by those skilled in the art, is subject to modifications within the scope of the appended claims.

I claim:

1. A nut and screw device comprising a nut having an internal helical groove, a screw having a corresponding external helical groove, said grooves cooperating with each other to form a race, a train of balls loaded in said race providing a connection between the nut and screw, and means for returning the balls from one end of the race to the other end of the race including return passageway means on the nut and screw separate from and independent of said grooves cooperating with each other to form a helical return passageway sufficiently large to freely accommodate the balls at all times during nut and screw device operation.

2. A nut and screw device as defined in claim 1 wherein said return passageway means on the nut and screw comprise respectively a wall portion on the nut formed by an internal helical return groove on the nut and a wall portion on the screw formed by a corresponding external helical return groove on the screw.

3. A nut and screw device as defined in claim 1 wherein said return passageway means on the nut and screw comprise respectively a wall portion on the nut formed by an internal helical return groove on the nut and a wall portion on the screw formed by an external helical return groove on the screw, said external helical return groove being larger than said internal helical return groove.

4. A nut and screw device as defined in claim 1 wherein said return passageway means on the nut and screw comprises respectively a wall portion on the nut formed by an internal helical return groove on the nut and a land portion on the screw, said helical return groove being sufficiently large to fully accommodate a ball.

5. A nut and screw as defined in claim 1 wherein said return passageway means on the nut and screw comprise respectively a land portion on the nut and a wall portion on the screw formed by an external helical return groove on the screw, said external helical return groove being sufficiently large to fully accommodate a ball.

6. In a ball nut device; a screw; a nut; first passage defining means on said screw and nut providing loaded helical passage means between said screw and nut; second passage defining means on said screw and nut providing an unloaded helical passage means interwound with said loaded helical passage means; balls in said passage means; transfer means at each end of said loaded and unloaded helical passage means to transfer said balls from either passage means to the other passage means; said loaded passage means having a configuration for engaging and loading said balls independent of the direction of relative nut and screw rotation and moving said balls to one or the other of said transfer means depending on the direction of relative nut and screw rotation, through the selected transfer means to said unloaded helical passage means, through said unloaded helical passage means in an unloaded condition independent of the direction of relative nut and screw rotation to the other transfer means for transfer to said loaded helical passage means.

7. A nut and screw device comprising a nut having a wall portion formed by an internal helical groove on the nut, a screw having a wall portion formed by a corresponding external helical groove on the screw, said wall portions cooperating with each other to form a race, a train of balls loaded in the race providing a driving connection between the nut and screw and being rolled therealong by said wall portions upon relative movement between the nut and screw, and means for transferring the balls to and from either end of said race including return passageway means on the nut and screw cooperating with each other to form a return passageway sufficiently large to always freely accommodate a ball during all nut and screw device operation so that a ball in the train of balls after leaving one end of said race and entering said return passageway is moved therealong in a direction opposite to the movement of the balls in the race by those balls which it precedes and which have a number thereof disposed in said race and being rolled therealong by said wall portions.

8. A nut and screw device as defined in claim 7 wherein said return passageway means on the nut and screw comprise respectively a wall portion on the nut formed by an internal helical return groove on the nut and a wall portion on the screw formed by a corresponding external helical return groove on the screw.

9. A nut and screw device as defined in claim 7 wherein said return passageway means on the nut and screw comprise respectively a wall portion on the nut formed by an internal helical return groove on the nut and a wall portion on the screw formed by an external helical return groove on the screw, said external helical return groove being larger than said internal helical return groove.

10. A nut and screw device as defined in claim 7 wherein said return passageway means on the nut and screw comprise respectively a wall portion on the nut formed by an internal helical return groove on the nut and a land portion on the screw, said helical return groove being sufficiently large to fully accommodate a ball.

11. A nut and screw device as defined in claim 7 wherein said return passageway means on the nut and screw comprise respectively a land portion on the nut and a wall portion on the screw formed by an external helical return groove on the screw, said external helical return groove being sufficiently large to fully accommodate a ball.

12. A nut and screw device comprising a nut having an internal helical groove, a screw having a corresponding external helical groove, said grooves cooperating with each other to form a race, a train of balls loaded in said race providing a connection between the nut and screw, and means for transferring the balls from one end of the race to the other end of the race including return passageway means on the nut and screw separate and distinct from said grooves cooperating with each other to form a helical return passageway portion sufficiently large to freely accommodate a ball at all times during nut and screw device operation, and ball deflector means for deflecting the balls to and from the race and helical return passageway portion, said ball deflector means comprising a deflector member having a main body portion, a pair of deflector fingers paralleling each other depending from said body portion, one of said deflector fingers being adapted to extend into the race and the other of said deflector fingers being adapted to extend into the helical return passageway portion, and a curved wall portion on said main body portion which in conjunction with said deflector fingers forms a substantially U-shaped path for ball travel between said race and helical return passageway portion.

13. A nut and screw device comprising a nut having a wall portion formed by an internal helical groove on the nut, a screw having a wall portion formed by a corresponding external helical groove on the screw, said wall portions cooperating with each other to form a helical race, a train of balls loaded in said race providing a connection between the nut and screw and being rolled therealong by said wall portions upon relative movement between the nut and screw, and means for transferring the balls from one end of the race to the other end of the race including return passageway means on the nut and screw cooperating with each other to form a helical return passageway portion sufficiently large to always freely accommodate a ball for moving balls in a continuously unloaded condition during any relative nut and screw movement along a path in a direction opposite to the movement of the balls in said helical race, and ball deflector means for deflecting the balls to and from the helical race and helical return passageway portion, said ball deflector means comprising a deflector member having a main body portion, a pair of deflector fingers extending from said body portion in the same direction, one of said deflector fingers being adapted to extend into the race and the other of said deflector fingers being adapted to extend into the helical return passageway portion, and a curved wall portion on said main body portion which in conjunction with said deflector fingers forms a substantially U-shaped path to provide a path for ball travel between said helical race and helical return passageway portion.

14. A nut and screw device comprising a nut having an internal helical groove, a screw having a corresponding external helical groove, said grooves cooperating with each other to form a race, a train of balls loaded in said race providing a connection between the nut and screw, and means for transferring the balls from one end of the race to the other end of the race including, return passageway means on the nut and screw cooperating with each other to form a helical return passageway portion sufficiently large to freely accommodate a ball during all nut and screw device operation and ball deflector means arranged adjacent either end of the race for deflecting the balls to and from the race and helical return passageway portion, said ball deflector means comprising a deflector member secured to the nut having a main body portion, a first deflector finger depending from said main body portion which is adapted to extend into said race, a second deflector finger depending from said main body portion which is adapted to extend into said helical return passageway portion, and an arcuate shaped wall portion on the main body portion which in conjunction with said deflector fingers forms a path for ball travel between said race and helical return passageway portion whose entrance and exit directions for ball travel parallel each other.

15. A nut and screw device comprising a nut having an internal helical groove, a screw having a corresponding external helical groove, said grooves cooperating with each other to form a race, a train of balls loaded in said race providing a connection between the nut and screw, means for returning the balls from one end of the race to the other end of the race including return passageway means on the nut and screw cooperating with each other to form a helical return passageway sufficiently large to freely accommodate a ball, said return passageway means on the nut and screw comprising respectively a wall portion on the nut formed by an internal helical return groove on the nut and a wall portion on the screw formed by an external helical return groove on the screw, and said internal helical return groove being larger than said external helical return groove.

16. A nut and screw device comprising a nut having a wall portion formed by an internal helical groove on the nut, a screw having a wall portion formed by a corresponding external helical groove on the screw, said wall portions cooperating with each other to form a race, a train of balls loaded in the race providing a driving connection between the nut and screw and being rolled therealong by said wall portions upon relative movement between the nut and screw, means for transferring the balls to and from either end of said race including return passageway means on the nut and screw cooperating with each other to form a return passageway sufficiently large to freely accommodate a ball so that a ball in the train of balls after leaving one end of said race and entering said return passageway is moved therealong in a direction opposite to the movement of the balls in the race by those balls which it precedes and which have a number thereof disposed in said race and being rolled therealong by said wall portions, said return passageway means on the nut and screw comprising respectively a wall portion on the nut formed by an internal helical return groove on the nut and a wall portion on the screw formed by an external helical return groove on the screw, and said internal helical return groove being larger than said external helical return groove.

References Cited by the Examiner
UNITED STATES PATENTS

| | | | |
|---|---|---|---|
| 2,833,156 | 5/58 | Spontelli | 74—459 |
| 2,895,343 | 7/59 | Orner | 74—459 |
| 2,924,113 | 2/60 | Orner | 74—459 |

DON A. WAITE, *Primary Examiner.*